UNITED STATES PATENT OFFICE.

SPENCER C. GRAVES, OF ST. LOUIS, MISSOURI.

COATING FOR WOOD, METAL, OR OTHER SURFACES.

1,124,012. Specification of Letters Patent. Patented Jan. 5, 1915.

No Drawing. Application filed January 2, 1913. Serial No. 739,770.

*To all whom it may concern:*

Be it known that I, SPENCER C. GRAVES, a citizen of the United States, residing at the city of St. Louis and State of Missouri, have invented a new and useful Coating for Wood, Metal, or other Surfaces, of which the following is a specification.

This invention relates to a new and useful composition of matter suitable for use as a coating for wood, metal or other surfaces and for a vehicle for coloring agents which may be applied as a paint to such surfaces.

An object of the invention is to produce a coating of the character specified which may be readily applied to wood, metal or other surfaces, and which will produce a serviceable finish for the same; which coating will be impervious to liquids including water, hydrocarbon oils, alcohols, ethers, and the like.

Another object of the invention is to produce a coating which may be applied to metal or cork floats, used in carbureter construction, which floats are subjected constantly to the action of gasolene and other hydrocarbon oils.

Another object of the invention is to produce a compound which may be utilized as a hermetic seal for metal or wood joints or seams.

Another object of the invention is to produce a water proof coating to which may be added various pigments or coloring agents thereby constituting a composition which may be utilized as a paint.

With these and other objects in view I have hereinafter disclosed my invention and specified the method of mixing or compounding the same.

In the production of the composition under the present invention I mix a quantity of pyroxylin with alcohol or with a mixture of alcohol and ether, to which mixture I add a quantity of dextrin. I have found in practice that the white commercial dextrin produces the best base for the coating, and that when wood alcohol is used ether is unnecessary. A sufficient quantity of wood alcohol, or the mixture of ether and alcohol, is used to a given quantity of dextrin and pyroxylin, so that the pyroxylin will be thoroughly dissolved and so that a part of dextrin will pass into solution and leave an excess of dextrin in suspension. The resultant compound is a liquid which may be readily spread upon smooth or rough surfaces and which, upon drying, produces a white smooth coating. The mixture of dextrin and pyroxylin in combination with the wood alcohol, or with the mixture of ether and alcohol, produces a liquid which adheres readily to the smoothest surface and which, upon drying, is sufficiently flexible to prevent it from cracking or blistering. The coating is very tenacious and strong and affords a protection or coating for the surface to which it is applied, which is entirely impervious to liquids, such as water, the hydrocarbon oils, etc. Thus in use as a coating for the surfaces of articles subjected to active liquids, such for instance as a coating for metal, cork or wood floats used in carbureters, it is very useful. As it is likewise impervious to water and moisture it is also useful as a preservative for woods and metals.

I have found in practice that the flexibility and adhesiveness of the coating may be increased by adding a quantity of castor oil, olive oil, or other similar oil, mixed with turpentine. These last mentioned ingredients, however, are not essential, but are preferred when the coating is to be used as a paint or as a coating for metals. It will be understood that various pigments may be added to the compound to impart to it various tints, when used as a paint.

A specific illustrative formula for producing a given quantity of the compound under the present invention, is as follows: Ether and alcohol (3 parts by volume, ether, 1 part, alcohol), 1 gallon; (or wood alcohol, 1 gallon); 4 ounces pyroxylin; 4 ounces white dextrin; 3 ounces of castor oil, and 5 ounces of Canada turpentine.

It will be understood that the above formula is illustrative only as the relative quantities of the ingredients may be varied to a considerable extent without changing the essential characteristics of the coating. An increase in the quantity of dextrin with respect to the quantity of pyroxylin utilized, merely increases the thickness of the ultimate coating after it has been applied to a surface and dried thereon, without changing the essential characteristics of the coating. One part by weight of pyroxylin will successfully bind from one to sixteen parts of dextrin, a one to eight mixture being eminently satisfactory for wood, a thinner coating being preferable for metals. It will be understood that the relative quantity of the dextrin, which acts as a filler, required with respect to the quantity of pyroxylin, depends to a large extent on the porosity of the surface to which the coating is to be applied. The amount of the carrying liquid required is such an amount as will thoroughly dissolve the pyroxylin and a part of the dextrin, holding the remainder of the dextrin in suspension so that the coating as an entirety may be readily spread upon the surface to which it is to be applied. The carrying liquid after application evaporates or vanishes leaving the residue of dextrin with the binder of pyroxylin as an integrally united impervious coating.

From the foregoing it will be understood that various changes in proportions may be made to suit specific requirements, and chemically equivalent ingredients may be substituted for those specified, without departing from the scope of the present invention. I do not limit myself, therefore, to exact proportions or elements, but

What I claim and desire to secure by Letters Patent is:—

1. A coating for metal, wood or other surfaces comprising dextrin and pyroxylin, in combination with a suitable solvent therefor substantially as specified.

2. A coating for metal, wood or other surfaces comprising in combination, dextrin, pyroxylin, and wood alcohol, substantially as specified.

3. A coating for metal, wood or other surfaces comprising pyroxylin, dextrin and castor oil, in combination with a suitable solvent and carrying liquid therefor substantially as specified.

4. A coating for metal, wood or other surfaces comprising pyroxylin, dextrin, castor oil, turpentine and wood alcohol, combined in the proportions substantially as specified.

5. A coating for wood, metal or other surfaces having the characteristics described comprising pyroxylin, a solvent for the pyroxylin and dextrin compound, substantially as described.

In witness whereof, I have signed this specification in the presence of two subscribing witnesses.

SPENCER C. GRAVES.

Witnesses:
 NELSON THOMAS,
 L. C. KINGSLAND.